United States Patent [19]

Fins

[11] Patent Number: 5,353,694
[45] Date of Patent: Oct. 11, 1994

[54] HEATING AND COOKING APPARATUS

[76] Inventor: Todd Fins, 232 Saddlebow Rd., Westhills, Calif. 91370

[21] Appl. No.: 105,510

[22] Filed: Aug. 11, 1993

Related U.S. Application Data

[63] Continuation-in-part of Ser. No. 921,061, Jul. 29, 1992, Pat. No. 5,237,912.

[51] Int. Cl.⁵ .................................. A47J 37/07
[52] U.S. Cl. .......................... 99/393; 99/400; 99/402; 126/41 R; 126/92 B
[58] Field of Search ............... 99/391, 393, 399, 400, 99/402; 126/41 R, 30, 91 R, 92 AC, 92 B; 211/119

[56] References Cited

U.S. PATENT DOCUMENTS

| | | | |
|---|---|---|---|
| 1,733,137 | 10/1929 | Spang | 99/402 |
| 2,048,769 | 7/1936 | Anderson | 99/393 |
| 2,201,756 | 5/1940 | Avetta | 99/393 |
| 2,693,751 | 11/1954 | Allen | 99/393 |
| 2,868,111 | 1/1959 | Laskowski | 126/41 R |
| 2,975,698 | 3/1961 | Miller | 99/402 |
| 3,362,393 | 1/1968 | Arnold | 126/41 R |
| 3,581,654 | 6/1971 | Tescula | 99/402 |
| 4,290,349 | 9/1981 | Fiorenza | 99/402 |
| 4,627,410 | 12/1986 | Jung | 126/41 R |

FOREIGN PATENT DOCUMENTS

| | | | |
|---|---|---|---|
| 2245816 | 5/1973 | Fed. Rep. of Germany | 99/402 |
| 16226 | of 1908 | United Kingdom | 99/393 |
| 26446 | of 1908 | United Kingdom | 99/393 |
| 162819 | 5/1921 | United Kingdom | 99/400 |
| 211767 | 2/1924 | United Kingdom | 99/393 |

Primary Examiner—Timothy F. Simone
Assistant Examiner—Mark Spisich
Attorney, Agent, or Firm—J. E. Brunton

[57] ABSTRACT

A combination heating and cooking apparatus that can be used by campers and sportsmen to provide warmth as well as to provide a convenient means for cooking a wide variety of foods at any selected location within the campground. The apparatus is completely self contained with the heating unit being connected directly to a source of heating gas, such as a small propane tank, and with the cooking accessory being removably connected to the heating unit. The cooking accessory adjustably supports the food being cooked directly in the path of the heat radiating from the burner so that the food can be initially seared to seal in its natural juices and can be progressively moved away from the burner to accomplish slow, uniform, no-flare grilling.

6 Claims, 8 Drawing Sheets

HEATING AND COOKING APPARATUS

BACKGROUND OF THE INVENTION

This is a continuation in part of copending application, Ser. No. 07/921,061 filed Jul. 29, 1992, U.S. Pat. No. 5,237,912.

FIELD OF THE INVENTION

The present invention relates generally to cooking and heating apparatus. More particularly, the invention concerns an apparatus usable with portable radiant heaters for cooking steaks, fish and the like.

DISCUSSION OF THE INVENTION

In recent years, portable radiant heaters have become very popular for outdoor camping. The heaters take the place of messy and dangerous campfires and typically comprise one or more arrays of gas operated, ceramic burners which are usually mounted within highly polished reflector units. The ceramic burners are often directly connected to small portable propane tanks, so that the entire assemblage can be readily moved from place to place to provide highly concentrated localized heat. The heating units require no electricity, they are safe, silent and odorless in operation and require no warm-up time.

The thrust of one form of the present invention is to provide a compact, easy to use food cooking accessory that can be directly connected to the radiant heater unit so that the unit can be used not only as a source of warming but also to conveniently cook various kinds of food. For example, foods such as steaks, fish, chicken parts and the like can be securely clamped between cooking racks that comprise a part of the cooking apparatus. The cooking racks can then be adjustably positioned directly in the path of the heat radiating from the ceramic burners so that the food can be quickly and easily cooked at almost any outdoor location.

The cooking accessory, which can be conveniently clamped to the reflector of the standard radiant heater, also includes a convenient drip pan which collects greases and oils emitted from the food as it cooks. The spacing between the cooking racks which clamp the food can easily be adjusted to readily accommodate various foods, such as steaks of different thicknesses. The spacing between the cooking rack and the ceramic burners can also be easily adjusted so as to control the rate of cooking.

SUMMARY OF THE INVENTION

It is an object of the present invention to provide a readily portable combination heating and cooking apparatus that can be used by campers and sportsmen to provide warmth as well as to provide a convenient means for cooking a wide variety of foods at any selected location within the campground.

It is another object of the invention to provide an apparatus of the aforementioned character which is completely self contained with the heating unit being connected directly to a source of heating gas, such as a small propane tank, and with the cooking accessory being removably connected to the heating unit.

Another object of the invention is to provide an apparatus as described in the preceding paragraphs in which the cooking accessory adjustably supports the food being cooked directly in the path of the heat radiating from the burner so that the food can be initially seared to seal in its natural juices and can then be progressively moved away from the burner to accomplish slow, uniform no-flare grilling.

Still another object of the invention is to provide an apparatus of the class described in which fats and oils produced during the cooking step are safely captured within the removable drip pan conveniently disposed beneath the cooking racks.

Another object of the invention is to provide a combination heating and cooking apparatus which is low cost, compact, light weight, easy to use and easy to assemble and disassemble for cleaning, transport and storage.

DESCRIPTION OF THE INVENTION

Figure 1:
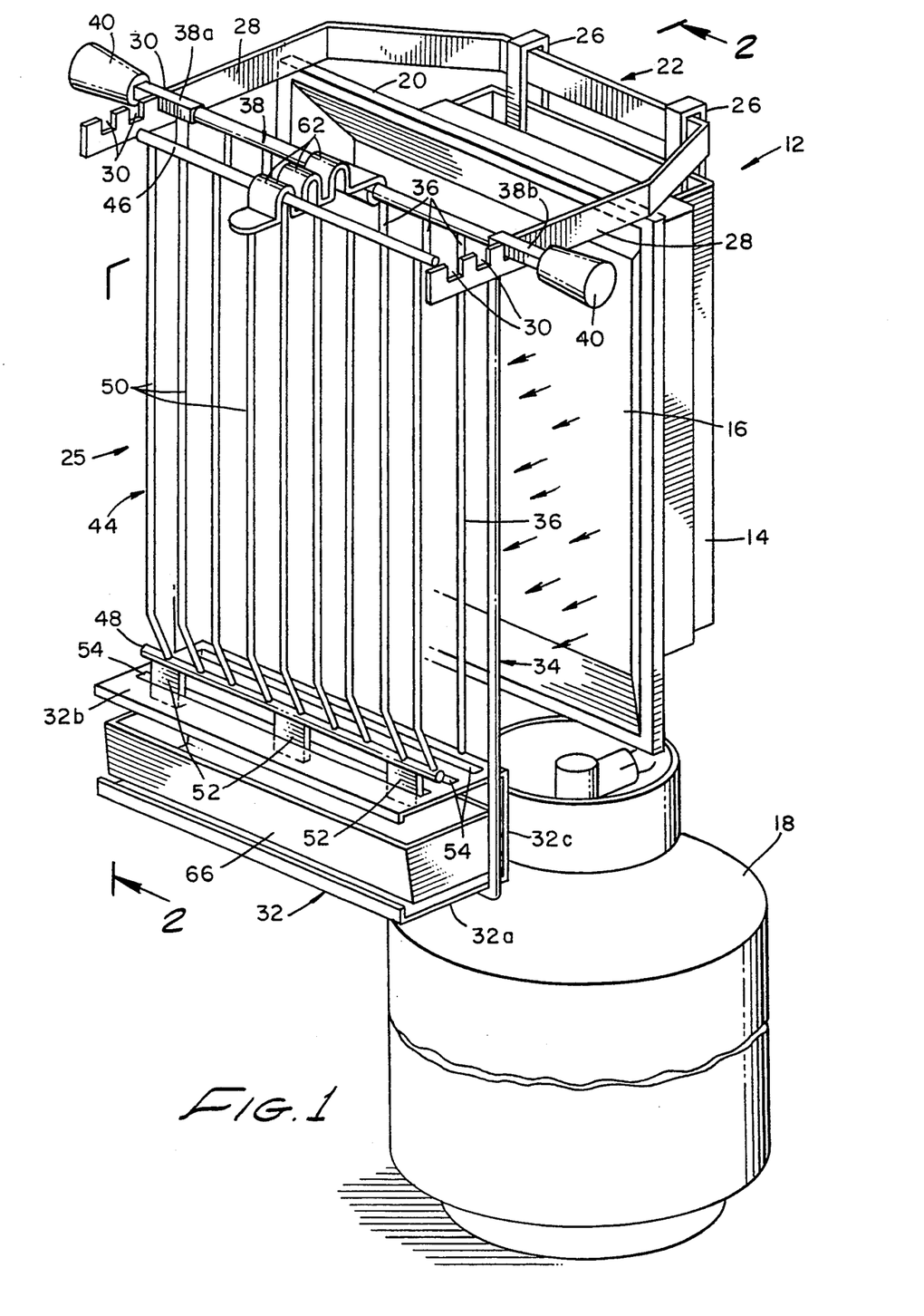
FIG. 1 is a generally perspective view of the cooking apparatus of one form of the invention.
Figure 2:
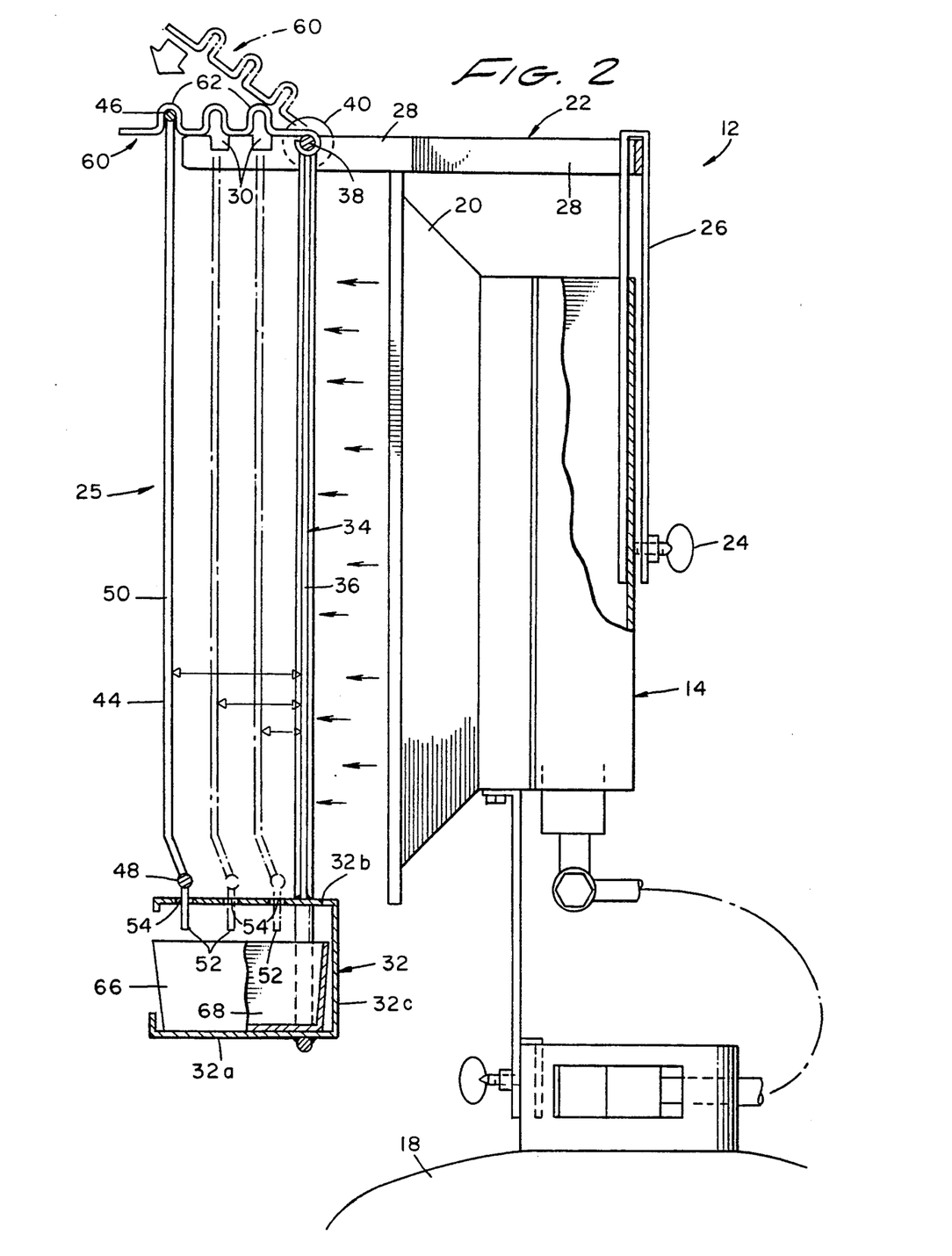
FIG. 2 is a view taken along lines 2—2 of FIG. 1.

Referring to the drawings and particularly to FIGS. 1 and 2, the combination heating and food cooking apparatus of the present invention is there shown and generally designated by the numeral 12. In this form of the invention, the apparatus comprises a gas operated, radiant heating unit 14 including a heating element 16 for radiating heat in a outwardly direction as indicated by the arrows in FIGS. 1 and 2. Heating unit 14 is operably interconnected with a source of gas shown here as a propane tank 18 of the character typically used in connection with campers and mobile homes. Propane tank 18 is of standard construction and is readily commercially available. The tank may vary in size from five gallons of propane or larger.

As best seen by referring to FIG. 2, radiant heating unit 14 also includes a reflector element 20 that circumscribes heating element 16 and functions to reflect radiant energy from the heating element in an outwardly direction. A heating apparatus of this character having an assembly comprising a radiant heating unit and a reflector element mounted on a propane tank is commercially available from TMP Distributors of West Hills, Calif.

Figure 4:
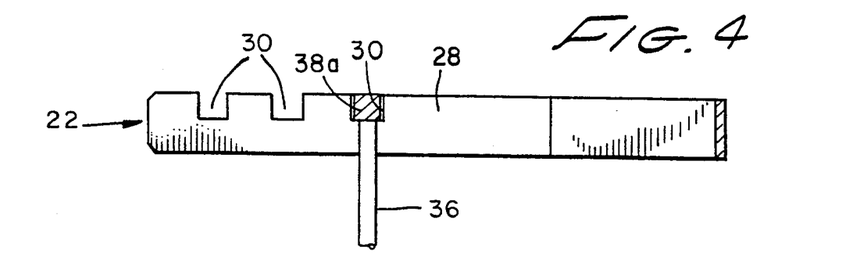
FIG. 4 is an enlarged, fragmentary view illustrating the manner in which a portion of the food holding structure is adjustably carried by the support arms which are interconnected with the source of radiant heat.

In accordance with the present invention, a supporting frame 22 is removably connected to the heating unit by means of a pair of thumb screws 24 (FIG. 2). In the present form of the invention, the supporting frame assembly comprises a pair of transversely spaced, generally vertically extending support elements or legs 26 upon which the thumb screws are mounted, and a pair of transversely spaced-apart support arms 28 which are connected to support legs 26 so that they extend forwardly of heating element 16 in the manner indicated in FIGS. 1 and 2. As best seen in FIGS. 1 and 4, each of the support arms 28 is provided with a plurality of notches 30 located near their outboard ends. The purposes of these notches will presently be described. As indicated in FIG. 2, the entire supporting frame 22 is removably interconnected to the heating unit by means of the thumb screws 24.

Forming an important feature of the apparatus of the present invention is the food holding rack assembly 25 which is supported by the supporting frame. This rack assembly is interconnected with the supporting frame in the manner shown in FIGS. 1 and 2 and depends downwardly from support arms 28 so that the food engaging rack portions of the rack assembly are disposed directly in the path of the heat radiating from the heating element 16.

Figure 3:
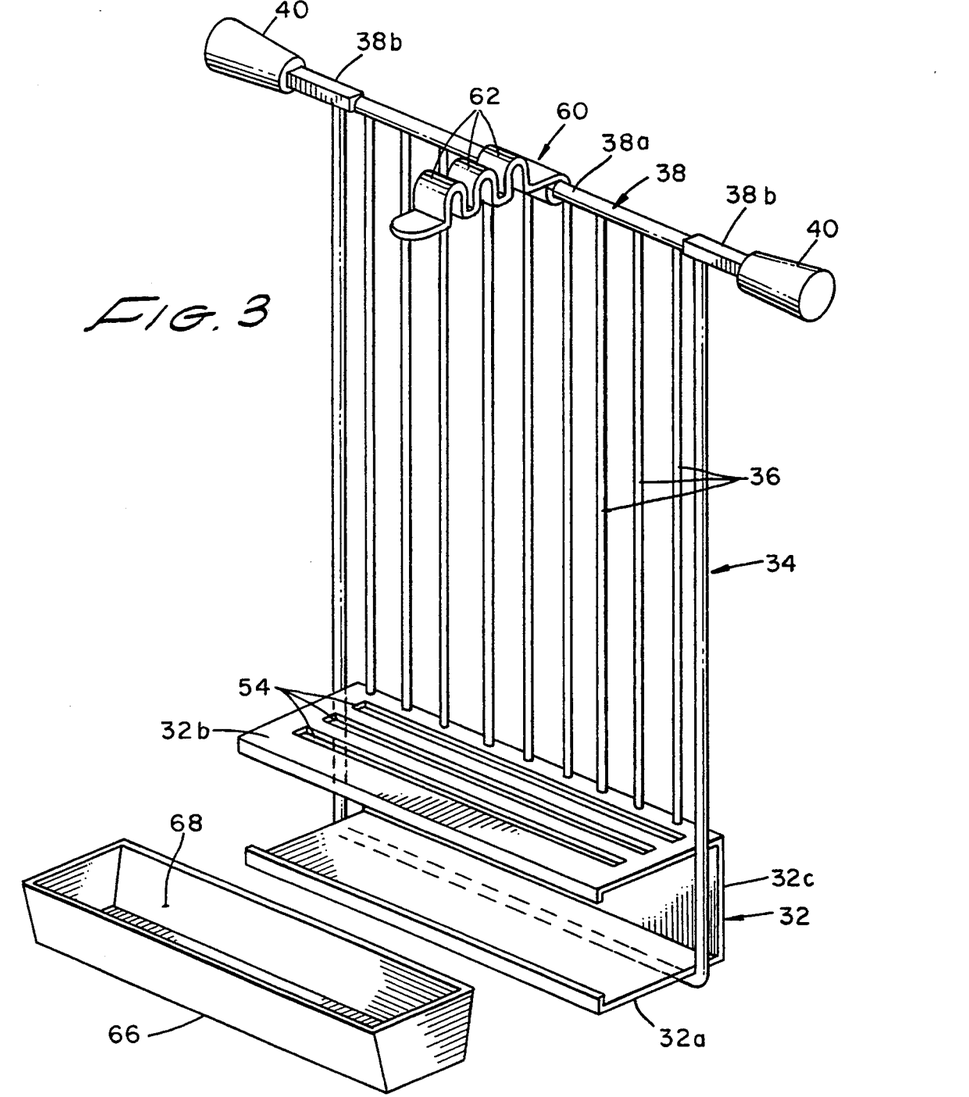
FIG. 3 is a generally perspective, exploded view of the food holding portion of the invention and the grease collection receptacle.

Turning also to FIG. 3 it can be seen that the rack assembly of the present embodiment of the invention comprises a base unit 32 which is generally U-shaped in cross section and includes a base plate 32a, a top plate 32b, and a bite portion 32c. A first food engaging rack 34 is connected to base unit 32 and extends upwardly therefrom in the manner best seen in FIG. 3. First food engaging rack 34 comprises a plurality of transversely spaced-apart, elongated rod-like elements 36 which are connected proximate their lower extremities to upper plate 32b of the base unit 32 and are connected proximate their upper extremities to a transversely extending lifting arm 38. Lifting arm 38 includes a central portion 38a and two end portions 38b which are generally rectangular in cross-section. Lifting handles 40 are connected to end portions 38b for conveniently lifting the rack assembly relative to arms 38. As indicated in FIG. 1, end portions 38b of arms 38 are closely receivable within oppositely disposed notches 30 provided in support arms 28. End portions 38b of rod 38 fit closely within the U-shaped notches 30 so as to prevent rocking of the food holding rack assembly relative to the heating element.

The food holding rack assembly of this form of the invention also includes a second food engaging rack 44 (FIG. 1) which comprises first and second, vertically spaced-apart connector rods 46 and 48. Disposed between connector rods 46 and 48 are a plurality of transversally spaced-apart, elongated rod-like elements 50. As best seen in FIGS. 1 and 2, depending downwardly from rod 48 are a plurality of transversely spaced-apart tab-like elements 52. Tab elements 52 are closely receivable within a selected one of three transversally extending, longitudinally-spaced slots 54 provided in top plate 32b of base unit 32 (see also FIG. 3). With this arrangement, it will be appreciated that the spacing between the first and second food engaging racks can be varied by inserting tab-like elements 52 in a selected slot 54. More particularly, as illustrated in FIG. 2, if elements 52 are inserted into the sot 54 which is disposed closest to the first food a minimum spacing between the food engaging racks will be achieved. On the other hand, if elements 52 are inserted in the slot 54 which is disposed furthest away from the first food engaging rack the maximum rack spacing will be achieved. To lock the top ends of the second food engaging rack in a position to maintain parallelism between the first and second racks appropriate locking means are provided. This locking means is shown here as a locking element 60 which is pivotally connected at one end to arm 38. Provided proximate the opposite end of element 60 are interengagement means for engagement with rod 46 of the second food engaging rack. It is to be noted that element 60 includes three transversely spaced-apart, generally U-shaped segments 62 within which rod 46 can be closely received. Segments 62 are spaced apart the same distance as are slots 54 provided in base plate 32. With this construction, the parallel relationship between the first and second food engaging racks can be maintained in each rack spacing orientation.

Turning to FIG. 3, it is to be observed that the rack assembly of the present invention also includes a catch basin or pan-like structure 66 having an internal reservoir 68. The catch basin is supported by base plate 32a at a location directly beneath the transversely-spaced slots 54 provided in the plate so that any oil or grease dropping from the food during cooking will be safely captured within reservoir 68 for convenient later disposal.

In using the apparatus of the invention, the first rack assembly in the configuration shown in FIG. 3 is laid flat on a table or similar flat surface. The food to be cooked, such as a steak, is then centrally positioned on rods 36. Next, the second food engaging rack is then interconnected with base plate 32a by inserting tabs 54 into one of the three slots 54 provided in the plate 32b. Which slot 54 is selected depends upon the thickness of the food article being cooked, the object being to clamp the food article securely between the first and second food engaging racks. After the food article has been clamped in position between the racks, the locking means or locking element 62 is swung into position so that the correct one of the U-shaped segments can be fitted over upper rod 46 of the second food engaging rack. With the locking element thusly located in a locked position, the food article to be cooked will remain securely clamped between the first and second food engaging racks during the cooking step.

The entire structure thus formed is lifted by handles 44 and end portions 38b are inserted into a selected pair of oppositely disposed notches 30 provided in forwardly extending support arms 28. If the food article being cooked is a steak, the device is preferably supported within the inboard notches, that is the notches closest to the heating element so that the meat can be initially seared. As cooking progresses, the rack can be moved outwardly relative to the heating element by displacing rod 38 into a selected pair of the outboard notches 30 provided in support arms 28. Because of the extreme heat of the ceramic cooking element 16 any grease that might splatter on the heating element is at once vaporized so that the heating element remains grease free.

Referring to FIGS. 5 through 13 of the drawings another form of the combination heating and food cooking apparatus of the invention is there shown and generally designated by the numeral 52. In this alternate form of the invention, the apparatus comprises a gas operated, radiant heating unit 54 including a heating element 56 for radiating heat in an outwardly direction as indicated by the arrows in FIGS. 5 and 8. Heating unit 54 is operably interconnected with a source of gas shown here as a propane tank 58 of the character typically used in connection with campers and mobile homes. As before, propane tank 58 is of standard construction and is readily commercially available.

Figure 7:
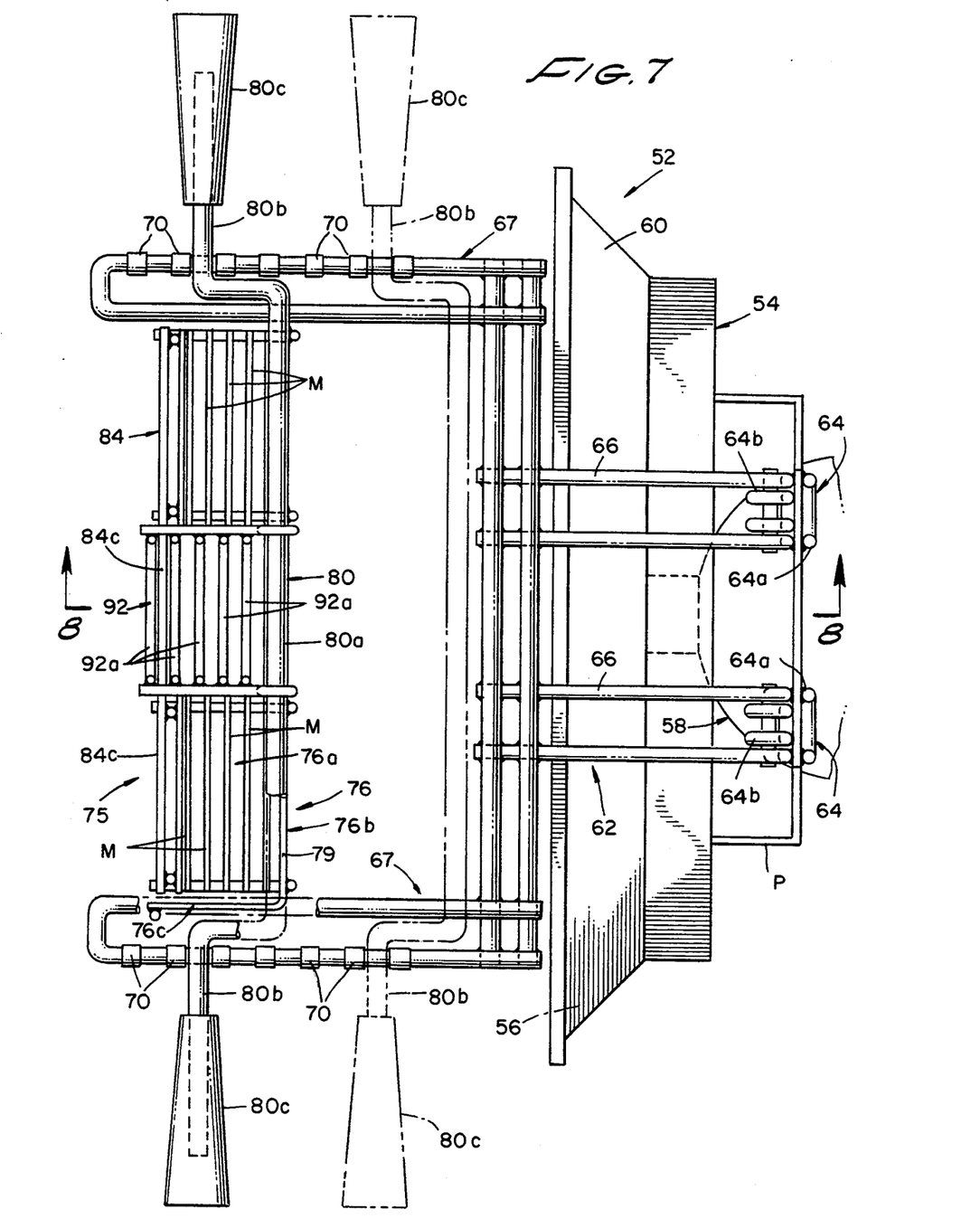
FIG. 7 is a top view of the alternate embodiment.

As best seen by referring to FIG. 7, radiant heating unit 54 also includes a reflector element 60 that circumscribes heating element 56 and functions to reflect radiant energy from the heating element in an outwardly direction.

Figure 5:
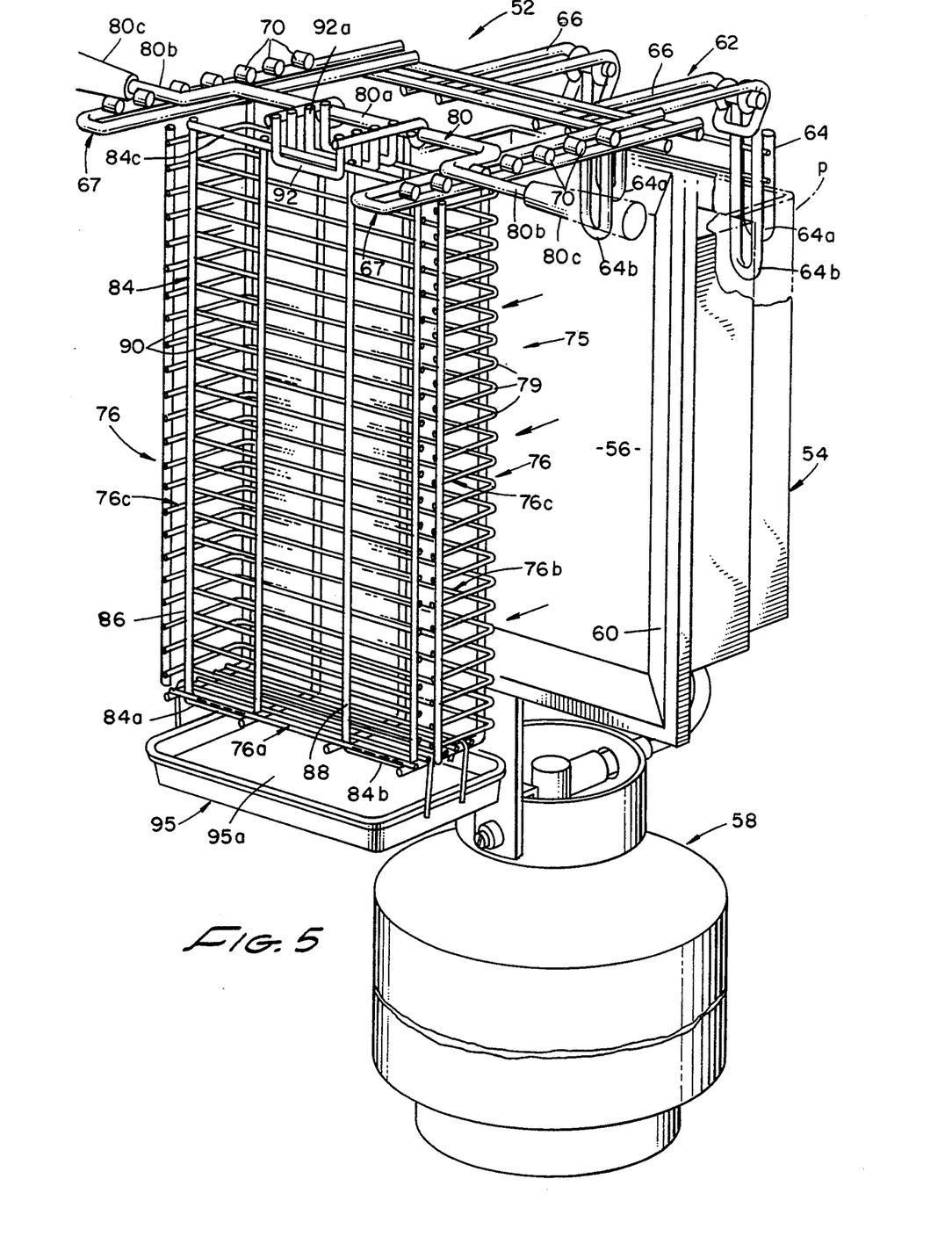
FIG. 5 is a generally perspective view of an alternate form of cooking apparatus of the invention.
Figure 6:
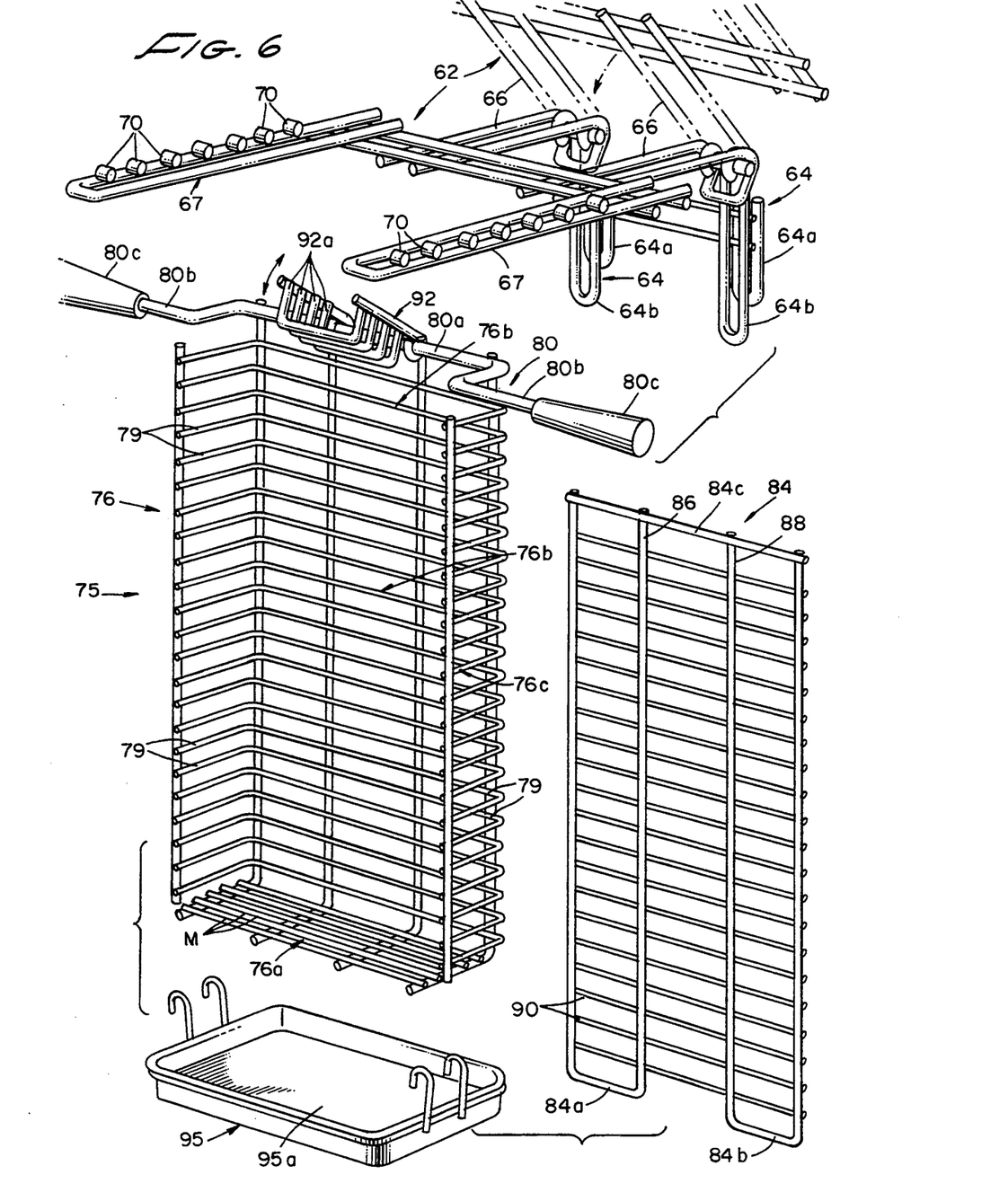
FIG. 6 is a generally perspective, exploded view of the food holding portion of the alternate embodiment.
Figure 8:
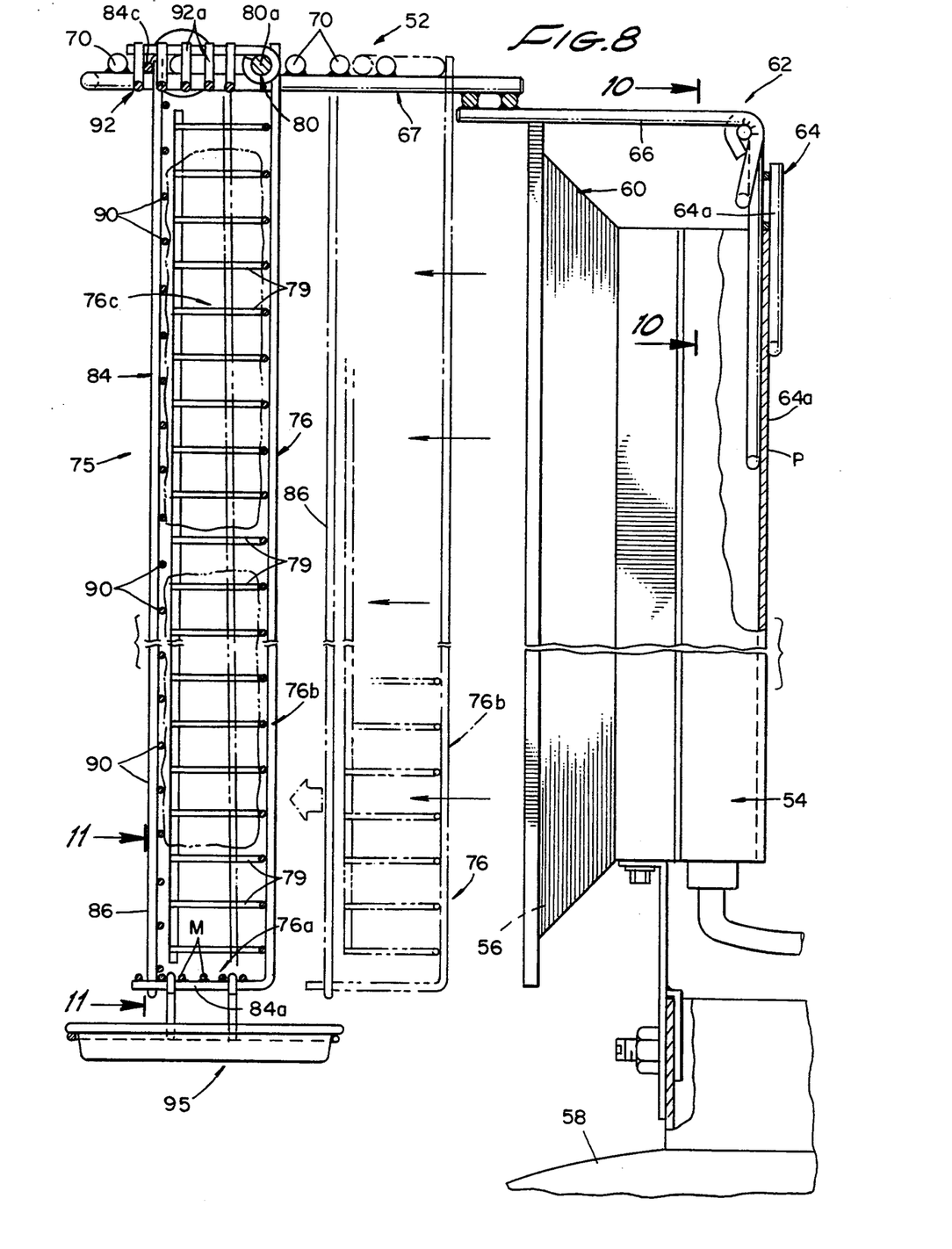
FIG. 8 is a cross-sectional view taken along lines 8—8 of FIG. 7.
Figure 9:
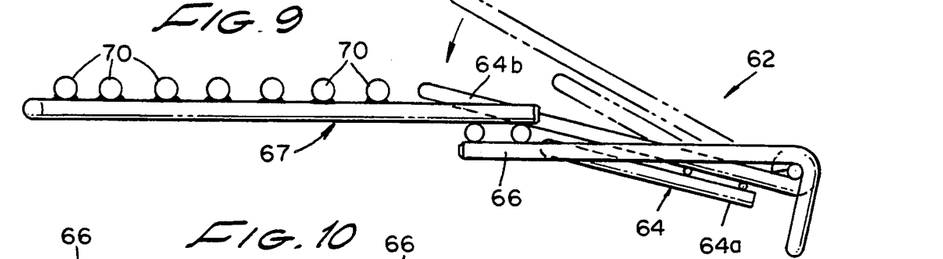
FIG. 9 is a fragmentary view illustrating the movement of the upper portion of the supporting rack of the invention.
Figure 10:
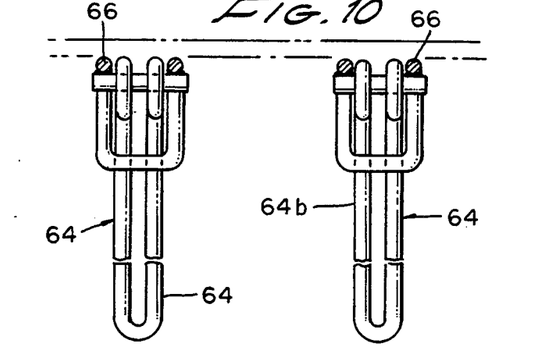
FIG. 10 is a cross-sectional view taken along lines 10—10 of FIG. 8.
Figure 11:
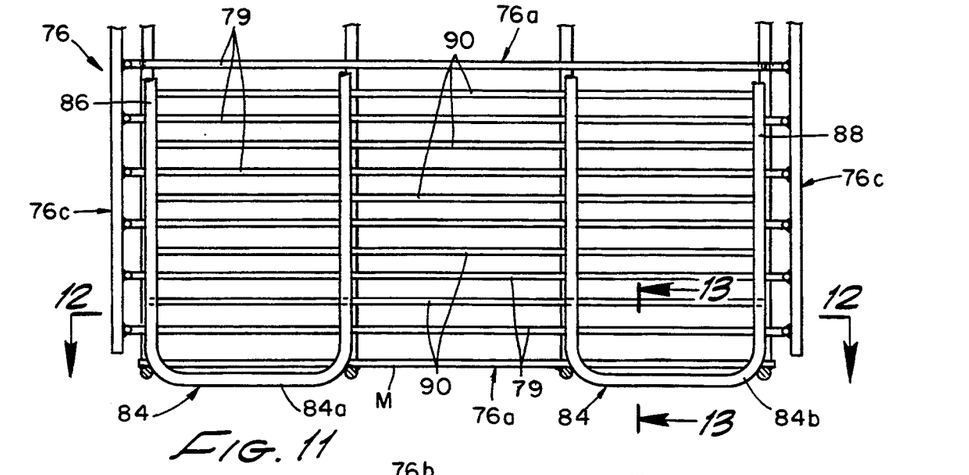
FIG. 11 is a view taken along lines 11—11 of FIG. 8.
Figure 12:
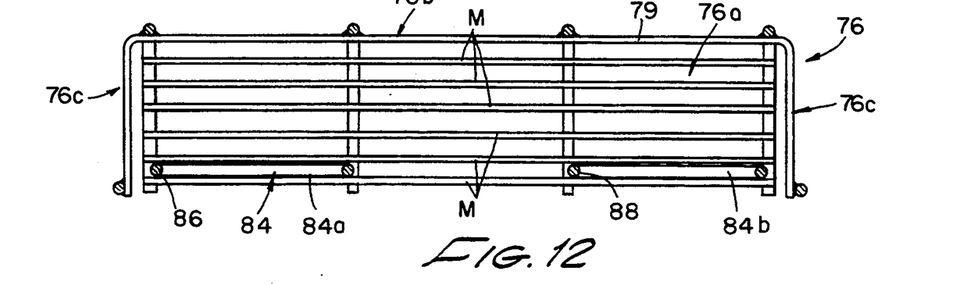
FIG. 12 is a cross-sectional view taken along lines 12—12 of FIG. 11.
Figure 13:
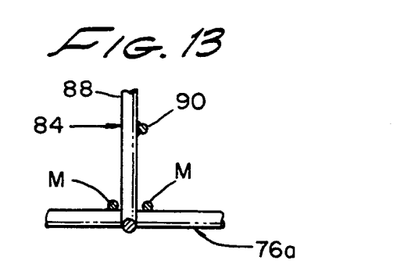
FIG. 13 is a cross-sectional view taken along lines 13—13 of FIG. 11.

In this latest embodiment of the invention, a supporting frame 62 is removably connected to the heating unit by means of a pair of downwardly extending support leg assemblies 64 each of which comprises spaced apart legs 64a and 64b (FIG. 8). As best seen in FIG. 8, back panel "P" of the heating unit is closely receivable between legs 64a and 64b. As indicated in FIG. 5, the supporting frame assembly of this alternate form of the invention cantilevers outwardly, or forwardly, of heating element 56. Referring also to FIGS. 6 and 8, it can be seen that the supporting frame here comprises a pair of transversely spaced, generally horizontally extending support elements 66 which are connected to support assemblies 64 so that they extend forwardly of heating element 56 in the manner indicated in FIG. 5. Connected to elements 66 are a pair of transversely spaced, generally horizontally extending support elements 67. Each of the support elements 67 is provided along its length with a plurality of spacer members 70, the purposes of which will presently be described.

Forming an important feature of this second form of the apparatus of the invention is the food holding rack assembly 75 which is supported by the supporting frame. This rack assembly is interconnected with the supporting frame in the manner shown in FIGS. 5 and 8 and depends downwardly from support element 67 so that the food contained within the rack is disposed directly in the path of the heat radiating from the heating element 56.

As indicated in FIG. 6, the rack assembly of the present embodiment of the invention comprises a first basket-like unit 76 which is generally U-shaped in cross section and includes a base 76a, a back portion 76b, and transversely spaced side portions 76c that extend outwardly from back portion 76b. First unit 76 is made up of a plurality of spaced-apart, wire-like elements 79 which are bent into the generally U shape configuration shown in FIG. 6. Connected proximate the upper terminus of basket-like unit 76 is a lifting arm 80 that includes a central portion 80a and two end portions 80b which are provided with lifting handles 80c. Lifting handles 80c can be used for conveniently lifting the rack assembly relative to support arms 66. As indicated in FIG. 5, end portions 80b of arm 80 are closely receivable between spacer members 70 provided on support arms 66 so that the rack can be positioned at different spacings from the radiant heating element.

The food holding rack assembly of this form of the invention also includes a front food engaging rack 84 (FIG. 6) which comprises first and second, vertically spaced-apart, generally U-shaped connector frames 80 and 88 to which a plurality of transversally extending, wire-like elements 90 are connected. As best seen in FIG. 8 the lower ends of the U-shaped frames are closely receivable between selected pairs of transversally extending, wire-like members "M" which form base 76a of the basket unit. With this arrangement, it will be appreciated that the spacing between back portion 76b and food engaging rack 84 can be varied by inserting the lower ends 84a and 84b of rack 84 between a selected pair of transversely extending members "M". To lock the top end of the front food engaging rack 84 in a position so as to maintain parallelism with back portion 76b of unit 76, appropriate locking means are provided. This locking means is shown here as a locking assemblage 92 which is pivotally connected at it inward end to the central portion 80a of arm 80. Assemblage 22 comprises four spaced-apart, generally U-shaped segments 92a between any two of which top member 84c of front rack 84 can be closely received. Segments 92a are spaced apart the same distance as are wire-like members "M" provided in base 76a of unit 76. With this construction, the parallel relationship between the front food engaging rack and back 76c can be maintained in each rack spacing orientation and the food to be cooled can be securely clasped between rack 84 and back portion 76b of basket 76.

Turning to FIG. 6, it is to be observed that the rack assembly of the present invention also includes a catch basin or pan-like structure 95 having an internal reservoir 95a. The catch basin is supported by basket 76 at a location directly beneath base portion 76a so that any oil or grease dropping from the food during cooking will be safely captured within reservoir 95 for convenient later disposal.

In using the apparatus of the invention, back portion 76b of basket like rack assembly 76 is laid flat on a table or similar flat surface. The food to be cooked, such as a steak, is then centrally positioned within basket-like member 76. Next, the front food engaging rack 84 is interconnected with base portion 76a by inserting U-shaped extremities 84a and 84b between a selected two of members M of base 76a. Which spacing is selected depends upon the thickness of the food article being cooked, the object being to clamp the food article securely between the back wall of the basket-like assemblage and the front food engaging member. After the food article has been clamped in position, the locking means or locking element 92 is swung into position so that the correct one of the U-shaped segments 92a can be fitted over upper wire-like member 84c of the front food engaging rack. With the locking element thusly located in a locked position, the food article to be cooked will remain securely clamped within the food holding assembly 75 during the cooking step.

The entire structure thus formed is lifted by handles 80c and end portions 80b are inserted between a selected pair of members 70 provided on forwardly extending support arms 66. If the food article being cooked is a steak, the device is preferably supported within two of the inboard members, that is the members closest to the heating element so that the meat can be initially seared. As cooking progresses, assembly 75 can be moved outwardly relative to the heating element by placing rod 80 between a selected pair of members 70 located forwardly of support arms 66.

After the food article has completely cooked, the catch basin 95 is removed and any grease that has been collected is disposed of. This done, the locking means or locking element 92 can be pivoted about rod 80 so that the front food engaging member can be removed from unit 76 enabling the cooked food article to be lifted from the unit. The food holding rack can be cleaned and returned to arms 80, or alternatively it can be stored for use at a later time.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A combination heating and food cooking apparatus comprising:
   (a) a container for containing combustible gases;
   (b) a gas operated burner panel connected to said container for radiating heat in an outward direction;
   (c) connector means for connecting said burner panel to said container, whereby said panel is superimposed over said container;
   (d) a supporting frame connected to said burner panel, said supporting frame having a support arm extending in an outward direction from said burner panel; and
   (e) a food holding rack assembly connected to said support arm, said rack assembly including a food receiving basket having a back portion and a front food engaging rack adjustably connected to said food receiving basket in a generally parallel spaced relationship with said back portion, said food holding rack assembly being disposed in the path of the heat radiating from said burner.

2. An apparatus as defined in claim 1 in which said front food engaging rack includes a top portion and in which said food holding rack assembly further includes locking means for engagement with said top portion of said front food engaging rack to lock said front food engaging rack in a fixed position relative to said back portion of said food receiving basket whereby the food to be cooked can be clamped between said front food engaging rack and said back portion of said food receiving basket.

3. An apparatus as defined in claim 2 in which said food holding rack assembly further includes a lifting arm connected to said food receiving basket and in which said locking means comprises a locking assemblage pivotally connected to said lifting arm.

4. A combination heating and food cooking apparatus comprising:
   (a) a container for containing combustible gases;
   (b) a gas operated burner panel connected to said container for radiating heat in an outward direction;
   (c) connector means for connecting said burner panel to said container, whereby said panel is superimposed over said container;
   (d) a supporting frame connected to said burner panel, said supporting frame having a support arm extending in an outward direction from said burner panel; and
   (e) a food holding rack assembly for holding the food to be cooked, said rack assembly being adjustably supported by said support arm so as to position the food in the path of the heat radiating from said burner and comprising a food receiving basket and a front food engaging rack adjustably connected to said food receiving basket.

5. A combination as defined in claim 4 in which said food receiving basket includes a bottom portion having spaced apart members and in which said front food engaging rack includes downwardly extending portions receivable between said spaced apart members provided on said bottom portion.

6. A combination as defined in claim 4 in which said food holding rack assembly further includes a lifting arm adapted to be adjustably connected to said support arm.

* * * * *